United States Patent [19]
Rosko

[11] Patent Number: 4,631,854
[45] Date of Patent: Dec. 30, 1986

[54] MULTI-REFLECTIVE FISHING LURE

[76] Inventor: Peter J. Rosko, 196 Old Oak Dr., Cortland, Ohio 44410

[21] Appl. No.: 828,343

[22] Filed: Feb. 11, 1986

[51] Int. Cl.$^4$ ............................................. H01K 85/00
[52] U.S. Cl. ................... 43/42.34; 43/42.33; 350/109
[58] Field of Search ............... 43/42.33, 42.34; 350/104, 106, 109; 40/903; 246/474; 362/348

[56] References Cited

U.S. PATENT DOCUMENTS

| | | | |
|---|---|---|---|
| 1,534,084 | 4/1925 | Schouboe | 350/109 |
| 1,787,733 | 1/1931 | Pagin | 43/42.34 |
| 1,862,893 | 6/1932 | Holtzclaw | 43/42.34 |
| 2,241,941 | 5/1941 | Bates | 43/42.33 |
| 2,480,580 | 8/1949 | Hopkins | 43/42.34 |
| 2,657,495 | 11/1953 | Eppinger | 43/42.34 |
| 3,069,801 | 12/1962 | Mills | 43/42.33 |
| 3,494,065 | 2/1970 | Benttinen | 43/42.33 |
| 3,851,947 | 12/1974 | Montgomery | 350/109 |
| 4,081,667 | 3/1978 | Lewin | 362/348 |
| 4,199,888 | 4/1980 | Barnes | 43/42.34 |

FOREIGN PATENT DOCUMENTS 110625 3/1944 Sweden ............................. 43/42.34

Primary Examiner—Nicholas P. Godici
Assistant Examiner—Christopher L. McKee
Attorney, Agent, or Firm—Harpman & Harpman

[57] ABSTRACT

A fishing lure, having a solid body, in a representation shape of a fish, with a multiplicity of complex fragmented reflective surfaces that provide a natural scaly glistening affect on the surface of the lure. Each of the reflective surfaces reflects light with a unique soft prism characteristic devoid of harsh glare.

2 Claims, 5 Drawing Figures

MULTI-REFLECTIVE FISHING LURE

BACKGROUND OF THE INVENTION

1. Technical Field

Fishing lures of this type are used to induce fish to strike the lure that looks the most lifelike in the water. Typically a shiny or reflective surface is formed on the lure to reflect light while moving the lure to impart a natural appearance thereto.

2. Description of Prior Art

Prior art devices of this type have relied on a variety of designs to attempt to duplicate the naturally occurring reflective qualities of real fish, see for example U.S. Pat. Nos. 4,074,455, 2,117,206, 1,692,222.

U.S. Pat. No. 1,692,222 discloses a decoration for fish lures wherein the body of the lure is embossed with a plurality of overlapping spheroid depressions. This imparts a scale look to the lure.

U.S. Pat. No. 2,117,208 discloses a fish lure having a series of widely spaced concaved depressions on the lure surface. Each of the depressions form a concave or parabolic shaped mirror configuration.

In U.S. Pat. No. 4,074,455 a fish lure can be seen having a soft plastic body with a plurality of small pockets of generally semispherical configurations that retain air bubbles within when submerged in the water. The bubbles create a lifelike breathing affect to the lure.

SUMMARY OF THE INVENTION

A fishing lure with a solid body having a plurality of multi-faceted fragmented reflective surface points, formed thereon, which impart a natural glistening and gleam characteristics of a real fish. Each of the reflective points contains a compound reflective construction that dissipates and diffuses the direct light rays by refracting same.

DESCRIPTION OF THE PREFERRED EMBODIMENT

Figure 1:
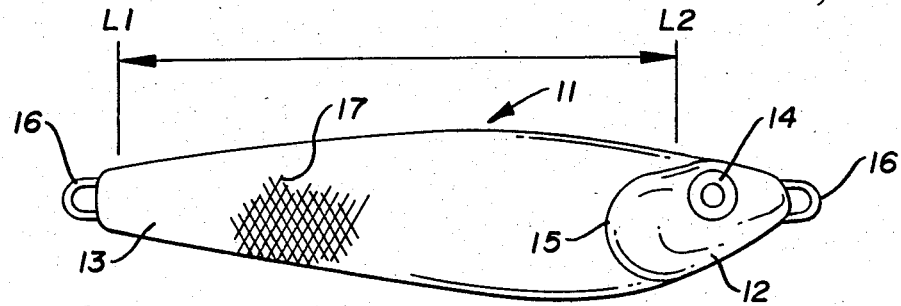
FIG. 1 is a side plan view of the body of a fishing lure.
Figure 2:
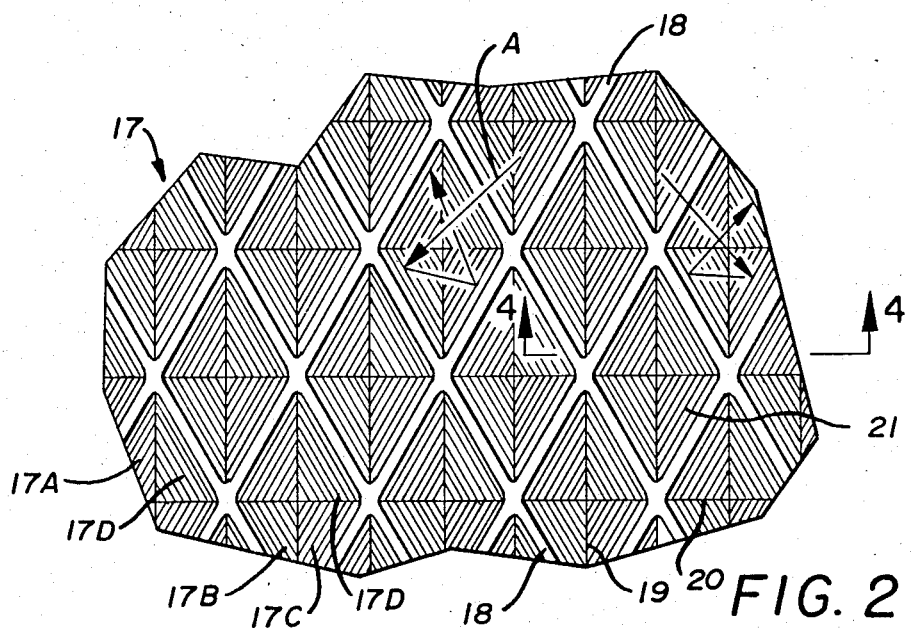
FIG. 2 is an enlarged section of a reflective surface on the fishing lure.

Referring to FIGS. 1 and 2 of the drawings, a fish lure 10 can be seen having a main body member 11 in the shape of a fish. The main body member 11 has a head portion 12 and an oppositely disposed tail portion 13 as will be well understood by those skilled in the art. An eye 14 and a gill line 15 defines the head portion 12 with a pair of oppositely disposed U-shaped hooks 16 imbedded at each end of the body member 11. The surface of the main body member 11, between L1-L2, is covered with a plurality of generally diamond shaped depressions 17 in a web-like pattern best seen in FIG. 2 of the drawings. Each of the diamond depressions 17, is separated from its adjacent neighbor by an interlocking ridge web 18.

Figure 4:
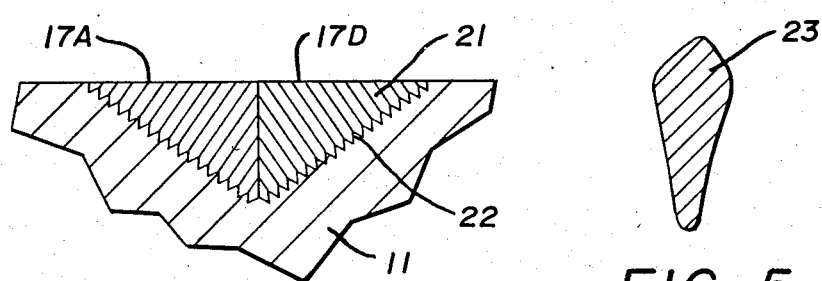
FIG. 4 is an enlarged cross section view on lines 4—4, FIG. 3 of a single reflective surface

Referring now to FIGS. 2 and 4 of the drawings, each of the diamond depressions 17 is divided up into four equal and opposing surfaces indicated generally as 17A, B, C and D, all of which descend into the diamond depression 17 on the same angle of inclination with each opposing surface, abutting one another on a pair of intersecting lines 19 and 20. The resultant triangular shape of each surface 17A, B, C or D, when viewed from above, has three sides of unequal length. Each of the surfaces 17A, B, C and D have a multiplicity of parallel edges 21, formed by descending steps 22, within the surfaces. The edges 21 are aligned with the portion of the ridge web 18 that abuts each surface.

It will be evident from the above description that a relatively complex compound reflective surface configuration has been created that reflects impinging light rays to opposite surfaces each of which has a different angular relation and refraction of light. This compound reflective surface enhances the characteristics of the lure wherein it is very similar to the appearance of a real fish which has a unique reflective characteristic imparted to it by its scale position and texture.

The reflective path of light is highly simplified for illustrative purposes in FIG. 2 of the drawings by arrows A.

Figure 3:
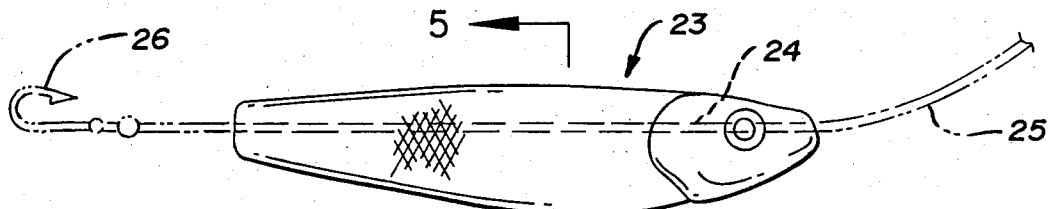
FIG. 3 is a side plan view of the fishing lure with a line and hook configuration shown in broken lines.

An alternate lure form can be seen in FIG. 3 of the drawings wherein a main body member 23 has a tube 24, in dotted lines, running lengthwise to provide a path for a fishing line 25 (in broken lines) extending there through. A hook 26 is illustrated on the end of the line 25 indicating how such a lure would be used.

Figure 5:
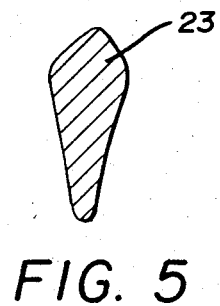
FIG. 5 is a cross-sectional view on lines 5—5, of FIG. 3.

Referring now to FIG. 5 of the drawings, the cross section of the lure in FIG. 3 is shown indicating the relatively flat surface area of the majority of the body member 22 which enhances the reflective ability of the lure. The fish lure 10 is made of a heavy material, such as lead, and is chrome plated giving it a good reflective surface. The head portion 12 gives off a bright, shiny appearance while the majority of the body is muted in reflective qualities due to its multiple reflective surfaces as herein before described. This contrast between the head portion 12 and the body portion further enhances the lifelike appearance of the fish lure.

Thus, it will be seen that a new and useful fishing lure has been illustrated and described, and it will be obvious to one skilled in the art that various changes and modifications may be made therein without departing from the spirit of the invention.

Therefore, I claim:

1. A reflective fishing lure having a main body member; a plurality of depressions on the body member, said depressions having a diamond shape configurated by four opposing secondary surfaces within said depression; a multiplicity of edges on each opposing secondary surface, said edges being parallel to the abutting diamond shaped configuration; means to secure a fishing line and a hook to said body member.

2. The reflective fishing lure of claim 1 wherein said means to secure a fishing line and hook to said body member comprises a fastener on either end of said body member.

* * * * *